United States Patent [19]

Graat et al.

[11] 4,248,806
[45] Feb. 3, 1981

[54] APPARATUS FOR PRODUCING INERT COMBUSTION GASES

[75] Inventors: Johannes W. Graat, Overasselt; Hans T. Remie, Nijmegen, both of Netherlands

[73] Assignee: Holec Gas Generators, Netherlands

[21] Appl. No.: 16,139

[22] Filed: Feb. 27, 1979

[30] Foreign Application Priority Data

Feb. 27, 1978 [DE] Fed. Rep. of Germany ....... 2808435

[51] Int. Cl.³ .............................................. B01F 3/04
[52] U.S. Cl. ..................................... 261/118; 55/236; 261/115; 422/194; 422/207; 423/461
[58] Field of Search ................................ 261/115–118, 261/DIG. 9, DIG. 54; 423/450, 456, 461; 55/236–239; 252/372, 373; 422/187–189, 194, 207; 431/8; 208/48 Q

[56] References Cited

U.S. PATENT DOCUMENTS

| 1,264,263 | 4/1918 | Brassert | 55/236 |
|---|---|---|---|
| 3,323,290 | 6/1967 | Stern | 55/236 X |
| 3,324,632 | 6/1967 | Berneike et al. | 55/236 |
| 3,358,413 | 12/1967 | Kalika | 55/239 X |
| 3,673,769 | 7/1972 | Gleason | 55/236 X |
| 3,870,456 | 3/1975 | Graat | 431/8 |
| 4,015,958 | 4/1977 | Leschonski et al. | 55/238 X |
| 4,049,569 | 9/1977 | Graat | 252/372 |

FOREIGN PATENT DOCUMENTS

| 980724 | 1/1965 | United Kingdom | 55/237 |
|---|---|---|---|
| 982525 | 2/1965 | United Kingdom | . |

*Primary Examiner*—Richard L. Chiesa
*Attorney, Agent, or Firm*—Cushman, Darby & Cushman

[57] ABSTRACT

An apparatus for producing oxygen-free combustion gases, comprising a combustion chamber provided with a cooling jacket or shell and wherein liquid or gaseous hydrocarbons are burnt with combustion air and subsequently cooled through spray cooling by water introduced through nozzles into the rear portion of the combustion chamber, whereupon secondary cooling and scrubbing take place within a secondary cooling zone subsequent to the plenum chamber of said combustion chamber and provided with a plurality of gas outlet ports. That spray heads are arranged in the region of said gas outlet port(s), to produce a spray stream or jet directed to said outlet ports. A chamber is connected to said outlet port which chamber is surrounded by a wall provided with at least one gas outlet port, with the stream or jet of said spray heads being aligned with said gas outlet ports.

6 Claims, 6 Drawing Figures

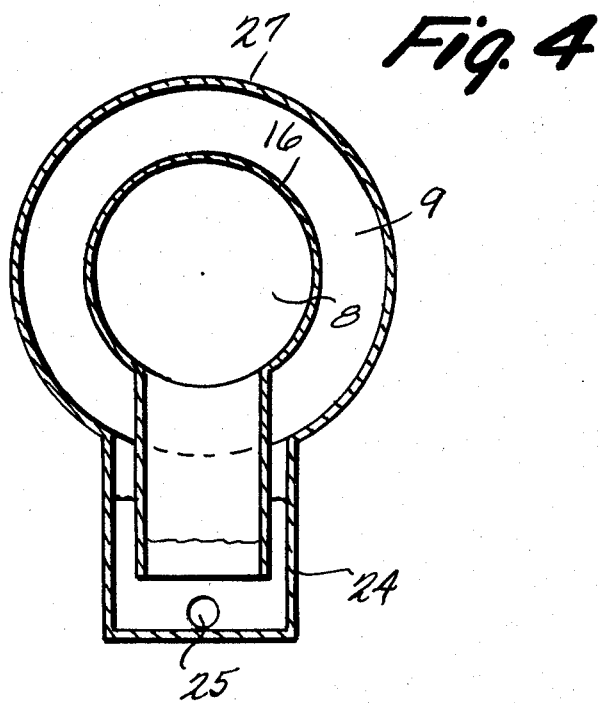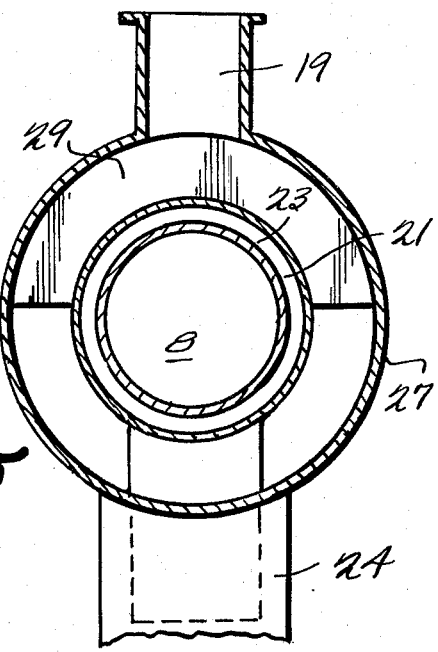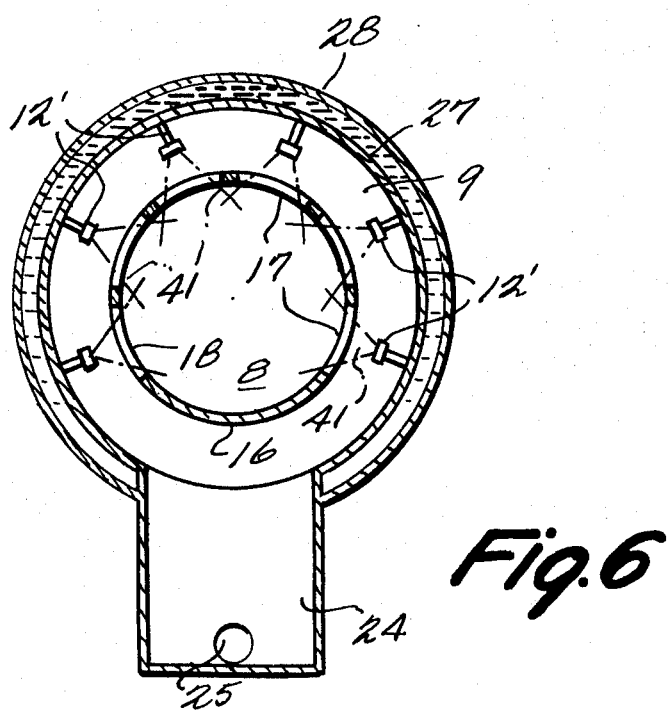

APPARATUS FOR PRODUCING INERT COMBUSTION GASES

The present invention relates to apparatus for producing preferably inert (oxygen-free) combustion gases. A combustion chamber is provided with a cooling jacket or shell and wherein liquid or gaseous hydrocarbons are burnt with combustion air. The combustion products are subsequently cooled through spray cooling by water introduced through nozzles in the rear portion of the combustion chamber (primary cooling zone), after which secondary cooling and scrubbing of the gases takes place.

The apparatus is designed preferably for the production of inert, i.e. oxygen-free combustion gases. The apparatus is also suitable for producing and cooling gases of higher oxygen content or other industrial gases generated by combustion. Preferably, the gases are to be obtained by stoichiometric combustion, such that they consist only of $CO_2$, $N_2$ as well as residues of (water) steam and noble gases.

It is known in the art to produce the combustion gas and to cool it in the rear part of the combustion chamber by means of water expelled from spray nozzles directly following the combustion (U.S. Pat. No. 4,049,569). Thereupon, the gas flows vertically through a scrubber, to be discharged from an overhead position. Cooling water is introduced from above to be distributed across the cross-section of the scrubber by a suitable nozzle and thereafter flows in a counterflow relation to the gas. Cooling water collected water in the sump of the scrubber is pumped into a commercially available cooler, e.g. a $CCl_2F_2$ cooler, after which it flows back into the scrubber. In the inert gas generator according to said U.S.-Patent, a gas of extremely low water content and correspondingly low dew point is obtained.

As practical tests have shown, the known inert gas generator operates in a fully satisfactory way. However, it has been found that this generator is too expensive for the production of relatively moist inert gas which is sufficient for many purposes.

In particular, operation of the scrubber is relatively costly. In order to improve the prior method, it is already known to provide the combustion chamber with an enlargement which has disposed on its walls spraying devices (spray nozzles, spray heads) adapted to be fed with the cooling water circulated through the cooling jacket. It has been found that the intense spraying exerted upon the inert gas provides an excellent scrubbing effect. In particular, $SO_2$ is substantially completely removed. However, a relatively great volume of water must be used in order to obtain sufficient interaction between the gas and the cooling water. Accordingly, the water consumption was unreasonably high in some cases.

Thus, it is the object of the present invention to improve the prior apparatus to the effect that secondary cooling can be effected intensely and nevertheless with relatively low consumption of water.

Accordingly, the present invention suggests that said secondary cooling and scrubbing take place within a secondary cooling zone behind to the plenum chamber of said combustion chamber which is provided with at least one gas outlet port; and that spray heads are arranged in the region of said gas outlet port(s), said spray heads being operative to produce a spray stream jet directed to said outlet ports.

This arrangement provides for an intense intermixing of gas and liquid, wherein the distribution and the fine degree of atomization are secured by suitable selection of the construction and design of the spray heads as well as by proper selection of the pressure applied. By concentrating the spray as such onto a given outlet aperture, a thorough intermixing between gas and liquid occurs.

In the following, the term "water" is meant to include also other liquids, especially aqueous solutions. Of course, the mechanical principle of the cooler may be applied also to the use of other liquid media. The spraying in the secondary stage, thus serves to remove by scrubbing contaminant material from the combustion gases.

The concept of the invention embraces various modes of operation which manifest themselves in the arrangements of the spray heads. On the one hand, the spray heads may discharge into the apertures or ports in parallel flow with the gas stream; on the other hand, these spray heads may be directed to the ports in opposition to the gas stream. If the spray heads are directed against the gas stream, the latter encounters a resistance that has to be overcome, but the intermixing effect may be higher under circumstances. Preferably, however, the spray stream is oriented in the direction of the gas flow passing through the ports, such that the gas stream receives additional impetus. Experience has shown that the fine distribution of the sprayed medium generated by this arrangement enables, a sufficiently large surface area of contact between the spray medium and the gas.

Advantageously, the combustion chamber used is cylindrical in shape. The outlet port for the gases produced, thus, is located substantially at the base or bottom side of the cylinder such that this base side may have connected thereto a chamber including the spraying device which is provided with a jacket or shell having at least one gas outlet port to which the spray stream of at least one spray head is directed.

Further, the invention suggests that said chamber is peripherally surrounded by a further chamber into which said gas outlet ports open; and that spray heads provided in one of said chambers are directed against the inner or outer wall of said shell. These arrangements allow the spray to be directed in parallel with or in counterflow relation to the gas flowing from the inner to the outer chamber. Furthermore, the spray heads may be advantageously mounted in a star-shaped configuration within one of the chambers, and connected to a water feed pipe.

Preferably, the combustion chamber provided with the spray cooler still further includes a construction in which the chambers or compartments are provided with a receiving and deflecting device which acts to separate from the remainder of the cooling water stream or jet, the cooling water to be discharged separately. To this end, a pressure-tight water outlet (water lock) is provided.

Finally, the invention may include in the return path of the gas, deflection plates to allow the liquid-laden gas to be still further dried.

The enclosed drawings illustrates exemplary embodiments of the apparatus according to the invention and provided with one combustion chamber. In the Figures:

FIG. 4 shows a cross-sectional view along lines 4—4 of FIG. 2;

FIG. 5 shows a cross-sectional view along lines 5—5 of FIG. 2; and

FIG. 6 is a view similar to FIG. 3 illustrating a modified embodiment having exteriorly disposed spray heads.

Figure 1:
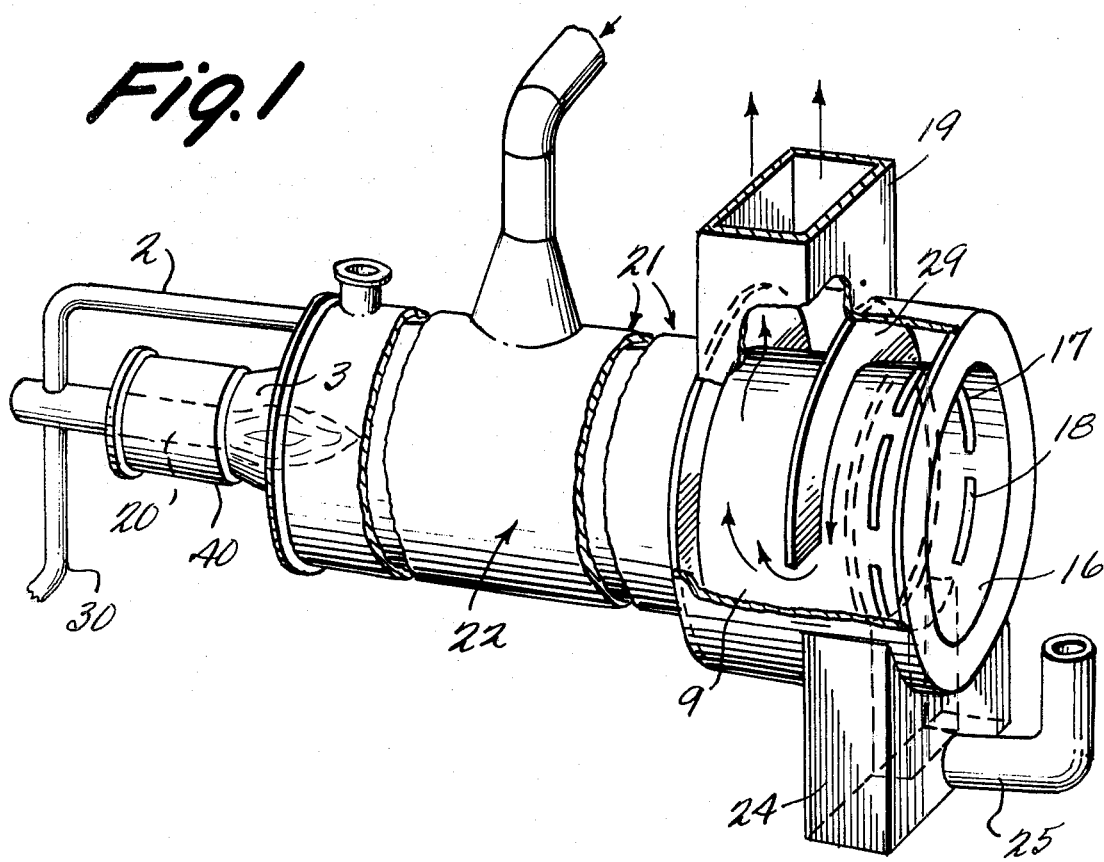
FIG. 1 is a perspective view of an apparatus according to the present invention with parts omitted.
Figure 2:
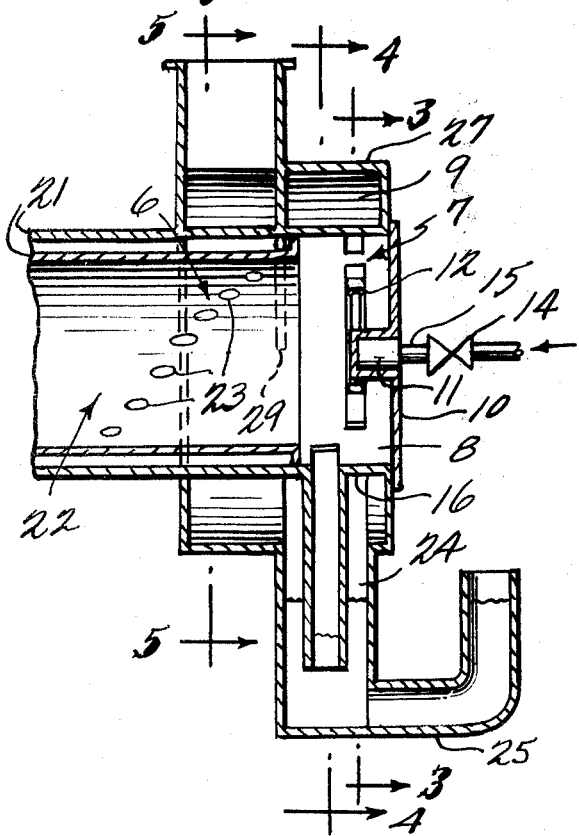
FIG. 2 is a sectional view of the rear portion of the apparatus according to FIG. 1.

FIG. 1 shows an embodiment of an inert gas generator which has, positioned within a closed cylindrical housing 40, a two-stage burner 20 adapted to burn e.g., fuel oil. The flame of the burner is directed into an inner or plenum chamber 22 of the combustion chamber.

An atomizing medium (air, gas, inert gas or steam) is supplied through a pipe 2. In order that the atomizing medium may be heated, pipe 2 passes through the interior of the combustion chamber. Combustion air is supplied to the burner 20 in a parallel flow via a pipe 30. The flame produced and the hot combustion gases enter, through an enlargement 3, into the plenum chamber 22 of the combustion chamber proper, which plenum chamber is of cylindrical configuration and enclosed by a double shell 21.

For performing and controlling the combustion and the production of the inert gas, a burner may be used as is disclosed e.g. in U.S. Pat. No. 3,870,456. Thus, explicit reference is made in these regards to the disclosure of this reference.

Figure 3:
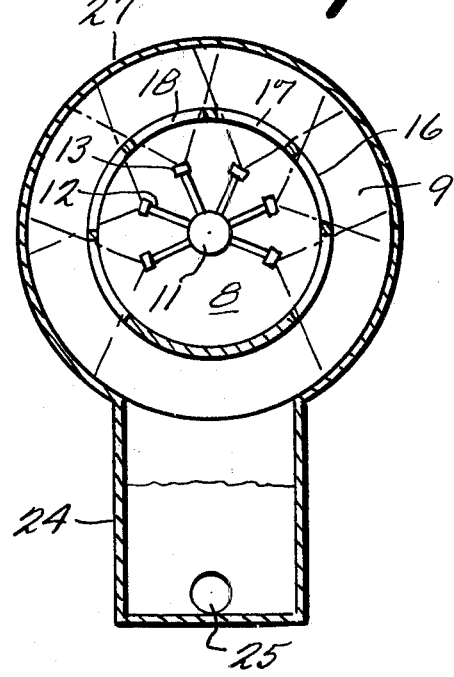
FIG. 3 shows a cross-sectional view along lines 3—3 of FIG. 2.

The double shell 21 acts at the same time as a cooled wall of the plenum chamber and as a feed duct for the cooling water to be sprayed. In the case of ships, the cooling water is obtained from the sea or from another suitable cooling water reservoir. The downstream portion of the double shell 21, as seen in the direction of gas flow, has spray nozzles 23 mounted to the inner side thereof. Through the spray nozzles 23, the cooling water enters the plenum chamber 22 in a finely divided form so as to effect a primary shock-like cooling (quenching) of the hot burner gases. The portion in which the cooling takes place, is termed the first or primary cooling zone 6. Subsequent to this primary cooling zone 6, a second or secondary cooling zone 7 is provided. In the embodiment shown, the secondary cooling zone 7 comprises a pair of concentrically disposed annular or cylindrical chambers 9 and 8 with the base or bottom face of chamber 8 being closed by an end plate 10. If required by the height of construction, an eccentric arrangement of chambers 9 and 8 may be chosen. The end plate 10 supports the bracket 11 for an assembly of spray heads 12 and 13 which are positioned in a star-shaped configuration as appears in FIG. 3. The bracket 11 at the same time serves as a supply nozzle for the water sprayed by the spray heads, and the bracket is connected to a water feed pipe 15 including a valve 14.

The two chambers 8 and 9 are separated by a center partition 16 which in turn is interrupted by a plurality of apertures or ports 17 and 18 aligned to the spray stream or jets 41 of the spray heads 12 and 13. The gas coming from the primary cooling zone 6 and being initially cooled, flows into chamber 8 which acts as a supply or feed duct. Further, the gas flows through ports 17 and 18 into chamber 9 acting as a discharge duct and then into an upper manifold discharge conduit 19.

Ports 17 and 18 are formed as narrow slots extending across a relatively long sector of the periphery. Accordingly, both the spray water and the gas to be cooled or scrubbed pass through the slot-type ports. Hereby, the gas is completely entrained into the spray stream to become thoroughly intermixed with the latter.

In this way, a relatively large contact area is established which allows water-soluble substances contained in the gases to be absorbed by the spray droplets. These substances include particularly $SO_2$ or $SO_3$. As can be seen, the ports 17 and 18 are positioned along a sectional line (the projection of) which would intersect an imaginary plane in the center partition 16 and disposed in parallel with the end plate 10. The spray heads of the spraying devices are designed in a known manner, and the spray jet is oriented so as not to reach beyond the peripheral portions of the ports 17 and 18, but rather fully cover their cross-sections, such that a minimum of water loss is involved.

Part of the water sprayed condenses on the outer walls of chambers 8 and 9. The water flows downwards into a pressure-tight water outlet 24 to be returned into the cycle after having been scrubbed and cooled. Also, it is possible to separately collect the water sprayed within the secondary chamber by means of a separate water outlet and to recycle the water through a separate circuit. However, it is also possible to feed both cooling circuits with sea water which is thereafter not regenerated, but simply discharged into the sea.

The cooling water circuits may be connected also in such a manner that the cooling water flowing through the double shell 21 is introduced also into pipe 15, so as to thereby feed the spray heads.

After the gas has passed through ports 17 and 18 and has chamber 9, the gas is conducted so as to flow across a deflection plate 29. Hereby, the flow velocity of the gas is reduced, and a major part of the entrained spray water is released from the gas. Of course, the gas may pass through a cascade of deflection plates 29 of this type. It is only at the end of this elongated path that the gas enters the manifold discharge conduit 19 to be conducted to the point of final utilization thereof.

The substantially dried inert gas (dew point by from 2° to 3° C. above the temperature of the available water) flows through the manifold discharge conduit 19 being equipped with a drop separator, into a utilization station.

FIG. 6 illustrates a modified arrangement of the spray heads. In this case, spray heads 12' are mounted to an outer wall 27 of the secondary chamber 9 in such a manner that they are directed inwardly to discharge their sprays in counterflow relation to the gas flow. The latter passes from the inner chamber 8 into the outer chamber 9 through outlet ports 17 in wall 16, similarly as in the embodiment according to FIG. 3. A ring main 28 is disposed around the outer wall 27 to supply water to the spray heads 12'.

It may be assumed that the inert gas is substantially free of sulfur dioxide ($SO_2$) after its passage through chamber 9. Still further, the rapid and complete discharge of the sprayed and loaded scrubbing water as provided by the construction of the spraying chamber, also allows to substantially completely prevent corrosion from taking place in the region of the spray nozzles and particularly in the area of the secondary cooling zone. Add thereto that the flow velocity of the cooling water is relatively high, such that deposits are avoided and a long operational life of the spray nozzles is thereby obtained. Accordingly, the necessity for opening the cooling portions of the combustion chamber in order to remove deposits arises after extremely long periods of operation only. For this reason, it becomes possible to use sea water as the cooling water.

What we claim is:

1. Apparatus for producing an inert gas from the combustion of liquid or gaseous hydrocarbon fuel with air, comprising:
   an elongated, substantially cylindrical first chamber including a combustion region at a first end of said first chamber and an adjoining cooling region at a second end of said first chamber, said first chamber having inner and outer walls defining a water jacket therebetween along the entire length and periphery of said first chamber;
   means for introducing said fuel and air into said combustion region;
   means for introducing water into said water jacket at said combustion region;
   a plurality of spray nozzle means, disposed along the length of said inner wall in said cooling region and around the periphery thereof, for spraying water received from said water jacket into said cooling region;
   a secondary cooler attached to said first chamber cooling region including a second chamber connected to said first chamber cooling region and having a longitudinal axis, a third chamber annularly disposed about said second chamber and a wall separating said second chamber and said third chamber, said wall defining at least one gas outlet port for interconnecting said second chamber and said third chamber; and
   at least one spray head means, disposed in said secondary cooler, for directing a stream of a fluid through said at least one gas outlet port, the average direction of said stream being substantially perpendicular to said axis, the relatively large contact area created between said stream and gases facilitating gas scrubbing and cooling.

2. The apparatus according to claim 1, wherein:
   said second chamber is cylindrical;
   said third chamber has cylindrical walls and is coaxial with said second chamber; and
   said wall is cylindrical.

3. The apparatus according to claim 1, wherein said apparatus comprises a plurality of said spray head means mounted within said second chamber in a star-shaped configuration and said apparatus further comprises a water supply conduit connected to said spray heads.

4. The apparatus according to claim 1, wherein said apparatus comprises a plurality of said spray head means mounted within said third chamber in a star-shaped configuration to the outer wall of said third chamber so as to direct said stream towards the center of said second chamber.

5. The apparatus according to claim 1, further comprising a pressure-tight water outlet disposed below said second and third chambers.

6. The apparatus according to claim 1, further comprising a duct for directing gases from said third chamber and a deflection plate disposed in said duct at least one deflection plate (29) is installed into the duct subsequent to said chamber.

* * * * *